Figures 1, 2, 3:
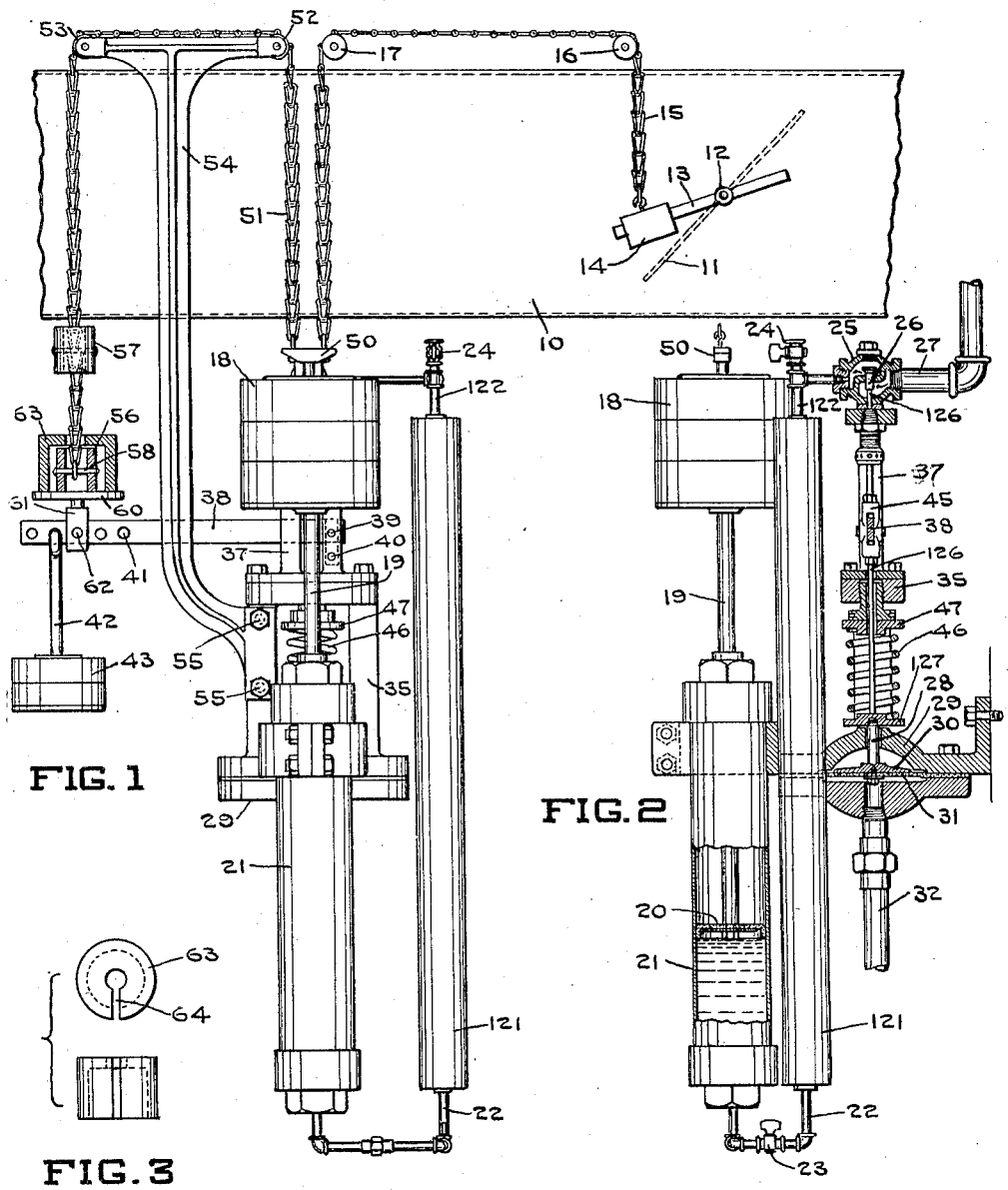

Aug. 12, 1924.

C. STICKLE 1,504,845

AUXILIARY FLUID PRESSURE CONTROL

Filed July 29, 1922   2 Sheets-Sheet 1

INVENTOR.
COLE STICKLE.
BY
Lockwood & Lockwood
ATTORNEYS.

Aug. 12, 1924.  1,504,845
C. STICKLE
AUXILIARY FLUID PRESSURE CONTROL
Filed July 29, 1922   2 Sheets-Sheet 2

INVENTOR.
COLE STICKLE.
BY
Lockwood & Lockwood
ATTORNEYS.

Patented Aug. 12, 1924.

1,504,845

UNITED STATES PATENT OFFICE.

COLE STICKLE, OF INDIANAPOLIS, INDIANA.

AUXILIARY FLUID-PRESSURE CONTROL.

Application filed July 29, 1922. Serial No. 578,359.

*To all whom it may concern:*

Be it known that I, COLE STICKLE, a citizen of the United States, and a resident of Indianapolis, county of Marion, and State of Indiana, have invented a certain new and useful Auxiliary Fluid-Pressure Control; and I do hereby declare that the following is a full, clear, and exact description thereof, reference being had to the accompanying drawings, in which like numerals refer to like parts.

This invention relates more particularly to an improvement upon, or an addition to, the auxiliary fluid pressure control apparatus shown and described in my former application for Letters Patent Serial No. 484,909, filed July 15, 1921 to enable the apparatus to move the damper or other part to be controlled to any desired stage or partial degree of movement and particularly in proportion to the steam pressure of the boiler.

The chief feature of my invention in said former application consisted in the combination of an adjustable spring with a weighted lever, and acting independently thereof, for influencing the action of a fluid pressure actuated means for actuating a pilot valve, in an auxiliary control, either in an independent fluid pressure line or in a direct steam line, for the ultimate control of a damper or other means desired to be controlled, and adapting the mechanism to act at a predetermined maximum and minimum fluid pressure.

In said former invention when there is a variable load with a slight variation of pressure, the piston will travel full length and completely close the damper, or completely operate the means to be ultimately controlled, whatever it might be. To get the best results, however, the mechanism should so operate that the damper would be partially closed or opened, or sufficiently to move the damper to the desired or right degree to furnish sufficient steam required for the particular purpose. This constitutes the object of the present invention.

To the foregoing end the present invention consists in adding or attaching to the former mechanism, particularly to the adjustable weighted piston or piston rod connected with the damper or other thing to be controlled, flexible means carrying adjustable weights, preferably a plurality of adjustable weights, arranged so as to engage and act upon the lever or part for controlling or influencing the damper or other part to be controlled.

Hence, said weights are suspended adjustably over said lever and preferably a plate is placed on said lever so that the weight will come in contact with the plate and check the movement of the lever. The construction is such that when the damper is moving toward the limit of its opening movement, the weight will move downward and engage the lever and check or retard the same and through the intermediate mechanism stop the opening movement of the damper before it has reached its possible limit of movement; and in the closing movement of the damper the weights move upward relieving the lever and thus checking the closing movement of the damper, substantially within the limits fixed by the amount and position of the weight and steam pressure.

This makes the device operative in proportion to the steam pressure or load, substantially, and the mechanism may not go to its limit of movement in either direction as in my former invention.

The full nature of this invention will be understood from the accompanying drawings and the following description and claims.

Figure 4:
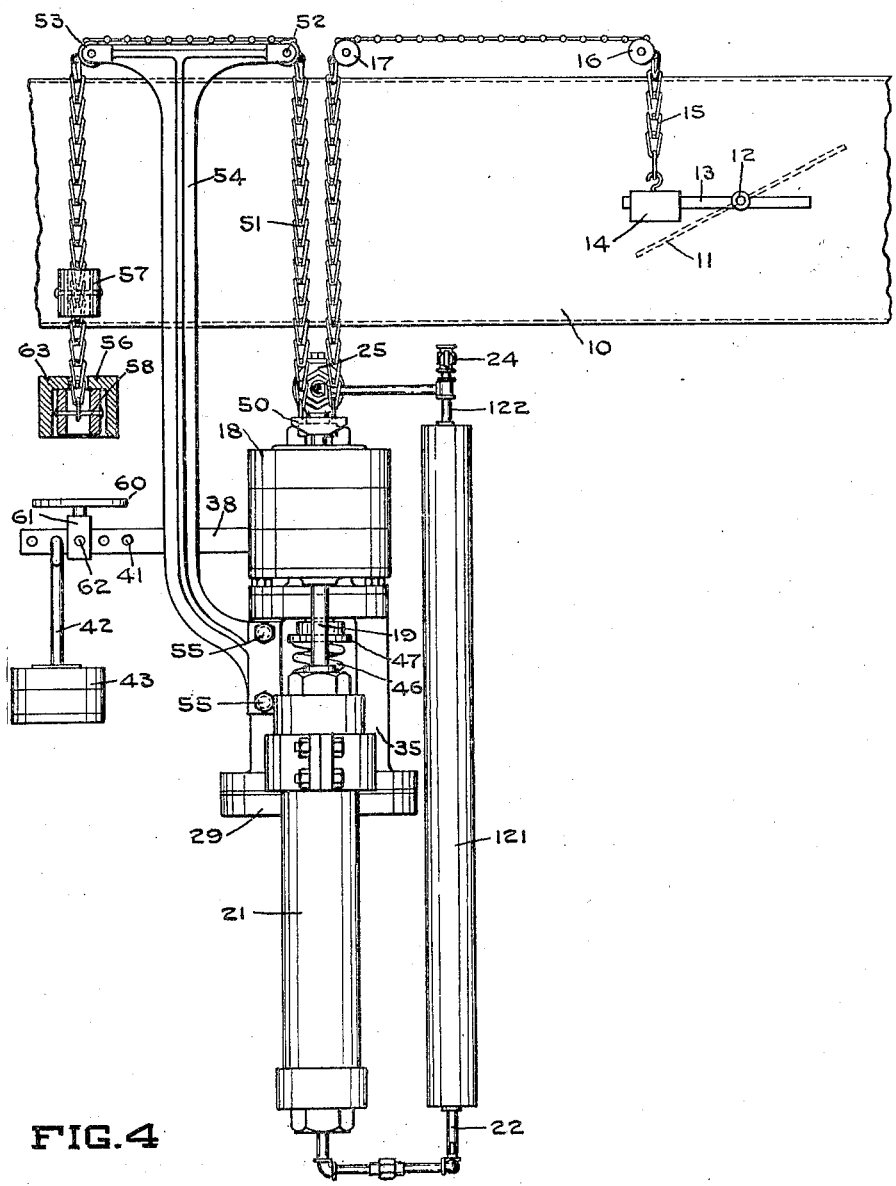

In the drawings Fig. 1 is a side elevation of the mechanism with parts in section and parts broken away and with the parts in their position when the damper is substantially closed. Fig. 2 is a view partly in elevation and partly in central section on the line 2—2 of Fig. 1. Fig. 3 is a detailed view of the auxiliary weights shown in Fig. 1. Fig. 4 is a view similar to Fig. 1 showing the parts in position when the damper is relatively open.

In Fig. 1 there is shown a flue 10 of a steam boiler in which there is a damper 11 shown by dotted lines centrally pivoted on a rod 12 so as to regulate said flue. An arm 13 outside of the flue is rigidly secured to the damper rod 12, and it carries a weight 14 sufficient to move the damper to closed position. A chain 15 is connected with the weight 14 and passes over pulleys 16 and 17 to a block 50 attached to an adjustable weight 18 on a piston rod 19 connected with a piston 20 in the cylinder 21. The weight 18 is sufficient to open the damper 11 unless it is counteracted or regulated by fluid pressure in the lower end of the cylinder 21 acting upward on the piston 20. Without fluid pressure in the cylinder 21, the weight 18 would open the damper; but with sufficient fluid pressure to raise the weight 18, the weight 14 would close the damper.

The cylinder 21 is supplied with water under pressure which comes from the displacement tank 121. The water in tank 121 is subjected to pressure from steam coming in through the pipe 122 and an independent auxiliary pipe 27. Said pipes are connected by a valve chamber 25 and controlled by a pilot valve 26. By interposing the displacement tank between the cylinder 21 and the steam line 122—27, the piston 20 is protected from the steam and also other advantages result. A leak valve 24 is in the pipe 122. This valve must always be open sufficiently to permit the steam to leak away after the valve 26 is closed, so that the water can rise in the displacement tank and also lower in the cylinder 21 under the weight 18, and thus return to normal position, when the piston 20 is at the bottom of the cylinder.

In the construction as it is shown in Figs. 1 and 2 the pilot valve 26 is open so that fluid under pressure has actuated the piston 20, lifted the weight 18 and permitted the damper to close. The pilot valve 26 has a valve stem 126 that extends down to the plate 127 which has a stem 28 passing through the upper wall of the diaphragm chamber 29 on a diaphragm plate 30 that is secured to a diaphragm 31, which is flexible material clamped between the upper and lower members of the diaphragm chamber. Steam directly from the steam boiler comes through a pipe 32 to the under side of the diaphragm and actuates the diaphragm, and through the intermediate means actuates and opens the pilot valve 26.

The pilot valve stem 126 rides loosely on the plate 127 and the stem 28 is conical at its lower end and fits loosely in the conical recess of the plate 30. A frame 35 extends upwardly from the diaphragm chamber 29, as seen in Fig. 2, and upon it there is another frame 37 in which a lever 38 is fulcrumed at 39 upon an upwardly extending link, pivoted at 40. The outer end of the lever 38 has holes 41 in it for a weight hook 42 which carries the weights 43. The lever 38 is pivoted in a sleeve 45 secured to the valve stem 126, so that the action of the weight 43 through the lever tends to force the valve stem downward. But in this construction, the weights 43 and the length of the lever 38 are such that they are not sufficient to overcome the ordinary steam boiler pressure in the pipe 32. Therefore, an additional but independent means for accomplishing this object is provided in the spiral spring 46 which surrounds the valve stem 126 loosely and rests upon the plate 127 at its lower end and carries a plate 47 on its upper end which screws into the upper part of the frame 35 so as to be vertically adjustable for tensioning the spring 36. Therefore, the spring 46 will cooperate with the weight 43 and lever 38, but act independently thereof, in holding the diaphragm down until sufficient steam pressure occurs in the steam pipe 32 to lift the diaphragm. When excessive steam pressure enters the pipe 32, the diaphragm will rise against the action of the spring 46 and the lever 38 and open the pilot valve 26.

Without my present improvement, when the steam pressure is relatively low in the boiler, the diaphragm 30 will be down and the pilot valve 26 closed, and the liquid will all be in the displacement tank 121, so that the piston 20 will be down in the lower end of the cylinder 21 and the weights 18 down, and thus lift the weight 14 and open the damper to cause a draft. When the steam pressure in the boiler has reached the desired degree, it lifts the diaphragm 30 and opens the pilot valve 26 and admits steam from the pipes 27—122 into the displacement tank 121, which forces the water into the cylinder 21 and lifts the piston 20 and weights 18, and that permits the weight 14 to move the damper towards closing position. Afterward, if the steam pressure becomes sufficiently low, the spring 46 and the lever 38 will close the pilot valve against the action of the steam pressure on the diaphragm, and thus shut off steam through the pipe 27 to the displacement tank 121. Then the steam in the upper end of the displacement tank will escape through the leak valve 24 and the water will leave the cylinder 21 and enter the tank 121 under the influence of the weight 18, and said weight 18 will open the damper.

By adjusting the spring 46 so that it will have a relatively high tension and will control a goodly portion of the steam pressure, the lever 38 can be comparatively reduced in size so as to enable the mechanism to be used in many situations where a longer lever is impossible or difficult of use. Thus, if the high pressure is 200 pounds, the spring 46 can be adjusted to resist substantially 150 pounds, and the lever substantially 50 pounds. However, a weighted lever should be preferably used when the spring is used, but the action of the two should be independent, so that the tension of the spring could be variable but accurately predetermined and then its tension remain relatively uniform regardless of the action of the weight and lever.

The construction so far described and without my present improvement is such that the controlling mechanism always goes to one limit or to the other of operation, that is it completely closes or completely opens the damper and operates whatever is to be controlled only to extreme positions. This is because the piston 20 will travel practically to its full upward limit of movement when the pilot valve 26 is open and when the pilot valve is closed it will travel practically to its downmost position, forcing all of the water out of the cylinder 21, and moving the damper 11 to its limit of open position.

The object of the present improvement is to enable the device to stop at any desired stage and not go necessarily to either limit of movement of the damper or other part controlled when there is any variation in the load. In the case of the construction herein shown for controlling the damper in a steam boiler construction, better results are attained by the more sensitive control of the damper and its operation by stages, as hereinafter more fully appears.

To accomplish this new result, as shown herein, a block 50 is connected with the weight 18 on the piston 19, to which the chain 15 is connected. Another chain 51 is connected with said block, or in any other way connected with said piston rod and extends from pulleys 52 and 53 mounted in the upper end of a T-frame 54 which extends up opposite and to a point above the flue 10 and which, at its lower end, as shown here, is secured by the bolts 55 to the frame 35. Thence the chain 51 extends downward over and almost to the weighted lever 38 which assists in controlling the pilot valve 26 and diaphragm 30. Said chain 51 has on its lower end a plurality of adjustably located weights 56 and 57. The weight 56 is located at the lower end of the chain and the weight 57 at a point thereon above the weight 56. The invention is not limited to the number of these weights and they can be located anywhere desired on said chain by means of the removable pin 58 which extends through the weight and through a link in the chain.

The disk 60 is mounted on the lever 38 by a support 61 slidable laterally on said lever and having holes 62 in it adapted to register with the holes 41 in the lever. An auxiliary and radially removable weight 63 is located on and surrounding the lower weight 56. This weight 63 is formed as shown in Fig. 3, being hollow and open on the under side and having a radially slotted opening 64 for the chain 51, whereby the weight can be placed on the chain 51 and let down to a position to surround the weight 56. The weight 63 is preferably located on the weight 56, but the invention is not limited to the particular minor weight on the chain which receives the major weight 63. The weighting of the lower end of the chain 51 is such as may be required, whatever that weight might be, to enable the device to operate as herein explained. However, the lower weight or weights are so placed as to rest upon the disk 60 of the lever 38, at times in the operation of the device, and thus influence the lever 38 and its action on the diaphragm and the pilot valve and the operation of the device.

When the steam pressure is sufficient to force upward the diaphragm and, therefore, the valve and instantaneously the lever 38, as shown in Figs. 1 and 2, the fluid under pressure in the pipe 27, through the piston 20, forces the piston rod up so that through the gravity of the weight 14 the damper will move toward the closing position.

As the piston rod thus goes upward the weights 56 and 63 move downward and then they come in contact with and rest upon the plate 60 of the lever 38, it will check the upward movement of the lever and, therefore, the opening movement of the pilot valve and the closing movement of the damper before it has reached the limit of its closing movement.

With the damper partially closed the production of steam by the boiler will correspondingly diminish and when the pressure of steam under the diaphragm becomes sufficiently reduced, the lever 38 and the spring 46 will move the pilot valve to closing position and then the water in the cylinder 21 will enter the displacement tank 121 under the weight of the piston and the weights carried by the piston rod, permitting the latter to descend slightly and as the piston rod descends the weight 18 will lift the weights 56 and 63 so they will not rest on the plate 60 of the lever 38 and said weights will cease to act on or influence the lever and the damper will be stopped at that stage and before it has reached the limit of its opening movement. By adjusting the weights 56 and 63 properly, both as to their gravity and the position of the lower weights, the extent of the partial opening and closing movement of the damper may be varied substantially. When the fire in the steam boiler is stimulated by the increased draft of the fire, due to the relative open position of the damper and the steam pressure becomes sufficiently great, the steam will force the diaphragm upward and open the valve.

This construction, therefore, allows for a wide range of action of the parts controlling the damper and the damper itself, and with my present improvement one is enabled to limit the action of the parts to any desired degree within said maximum limits above mentioned according to the nature of the work desired to be accomplished by the operator. In the actual construction of the machine the steam pressure in the pipe 27 is reduced by the reducer in said pipe, which is not herein shown.

The invention claimed:

1. Auxiliary fluid pressure mechanism, for steam boilers, including a weight, a cylinder, a piston and piston rod therein for elevating the weight, a replacement tank for supplying fluid under pressure to said cylinder and having a slight leak, a pipe for supplying fluid under pressure to said replacement tank, a valve for controlling fluid under pressure to said pipe, means actuated by the steam from the boiler for opening said valve, yielding means for closing said valve, and weighted means flexibly connected with said weight and tending to elevate the same and in position to engage said yielding means when said weight is near its upward limit of movement to aid in closing said valve.

2. Auxiliary fluid pressure controlled mechanism for steam boilers, including a flue for the steam boiler, a damper for said flue, a weight for closing the damper, a cylinder, piston and piston rod, a weight on said rod a flexible connection between the piston rod weight and the damper for opening the damper against the action of said weight, a replacement tank for supplying fluid under pressure to said cylinder and having a slight leak, a pipe for supplying fluid under pressure to said replacement tank, a valve controlling said fluid under pressure in said pipe, means actuated by the steam from the boiler for opening said valve, yielding means for closing said valve, flexible means connected with said piston, a weight thereon in position to engage said yielding means when the damper has reached the desired limit of partial closing movement and to disengage said yielding means when the damper has reached the desired limit of partial opening movement.

3. Auxiliary fluid pressure controlled mechanism for steam boilers, including a flue for the steam boiler, a damper for said flue, a weight for closing the damper, a cylinder, piston and piston rod, a weight on said rod, a flexible connection between the piston rod, weight and the damper for opening the damper against the action of said weight, a replacement tank for supplying fluid under pressure to said cylinder and having a slight leak, a pipe for supplying fluid under pressure to said replacement tank, a valve controlling said fluid under pressure in said pipe, means actuated by the steam from the boiler for opening said valve, yielding means for closing said valve, a chain connected with said piston, a plurality of weights connected with said chain in position to engage said yielding means successively when the damper is approaching the desired limit of partial closing movement and to disengage said yielding means successively when the damper is approaching the desired limit of partial opening movement.

In witness whereof, I have hereunto affixed my signature.

COLE STICKLE.